(12) United States Patent
Wiik et al.

(10) Patent No.: US 9,906,173 B2
(45) Date of Patent: Feb. 27, 2018

(54) METHOD FOR ESTIMATING MOTOR PARAMETER IN A LOAD COMMUTATED INVERTER ARRANGEMENT, AND A LOAD COMMUTATED INVERTER ARRANGEMENT THEREFOR

(71) Applicant: ABB Schweiz AG, Baden (CH)

(72) Inventors: Jan Wiik, Oslo (NO); Edgar Jellum, Asker (NO); Trond Haugen, Oslo (NO); Harald Fretheim, Aurskog (NO)

(73) Assignee: ABB Schweiz AG, Baden (CH)

( * ) Notice: Subject to any disclaimer, the term of this patent is extended or adjusted under 35 U.S.C. 154(b) by 111 days.

(21) Appl. No.: 14/516,120

(22) Filed: Oct. 16, 2014

(65) Prior Publication Data

US 2015/0097502 A1    Apr. 9, 2015

Related U.S. Application Data

(63) Continuation of application No. PCT/EP2012/056920, filed on Apr. 16, 2012.

(51) Int. Cl.
*H02P 6/12* (2006.01)
*H02P 25/03* (2016.01)
*H02P 23/00* (2016.01)

(52) U.S. Cl.
CPC ............ *H02P 6/12* (2013.01); *H02P 23/0077* (2013.01); *H02P 25/03* (2016.02)

(58) Field of Classification Search
CPC ..... H04W 88/08; H04W 72/0446; H02P 6/12; H02P 25/03; H02P 23/0077
USPC .................................................... 318/400.21
See application file for complete search history.

(56) References Cited

U.S. PATENT DOCUMENTS

| 4,088,934 A | * | 5/1978 | D'Atre | B60L 11/1803 318/802 |
| 4,088,935 A | * | 5/1978 | D'Atre | H02P 23/08 318/740 |
| 4,399,395 A | * | 8/1983 | Espelage | H02M 5/4505 318/803 |
| 4,427,933 A | * | 1/1984 | Wagener | H02M 7/529 318/711 |
| 4,449,087 A | * | 5/1984 | Lippitt | H02P 25/022 318/721 |

(Continued)

FOREIGN PATENT DOCUMENTS

| DE | 102004046950 A1 | 4/2006 |
| TW | 591882 B | 6/2004 |

OTHER PUBLICATIONS

International Preliminary Report on Patentability, Application No. PCT/EP2012/056920, completed May 20, 2014, dated May 20, 2014, pp. 10.

(Continued)

*Primary Examiner* — Eduardo Colon Santana
*Assistant Examiner* — Devon Joseph
(74) *Attorney, Agent, or Firm* — Whitmyer IP Group LLC

(57) ABSTRACT

A method for estimating a motor parameter in a load commutated inverter arrangement, including the steps of: measuring a motor side ac-voltage; detecting commutation interval information of the measured motor side ac-voltage; estimating a motor parameter based on the detected commutation interval information; and indicating when the estimated motor parameter deviates from a monitoring parameter thereof.

13 Claims, 5 Drawing Sheets

(56) References Cited

U.S. PATENT DOCUMENTS

| | | | | |
|---|---|---|---|---|
| 4,713,743 A * | 12/1987 | Abbondanti | .......... | H02P 25/024 323/210 |
| 5,012,172 A * | 4/1991 | Sember | .................. | H02P 3/065 318/685 |
| 5,825,152 A * | 10/1998 | Eriksson | ............... | H02P 25/024 307/83 |
| 6,144,179 A | 11/2000 | Kessler et al. | | |
| 6,472,842 B1 * | 10/2002 | Ehsani | ................ | H02P 25/0925 318/701 |
| 6,850,426 B2 * | 2/2005 | Kojori | ................ | H02P 23/0004 363/123 |
| 7,358,700 B2 * | 4/2008 | Qian | ....................... | H02P 23/14 318/801 |
| 7,495,410 B2 * | 2/2009 | Zargari | ............... | H02M 1/4216 318/438 |
| 7,701,165 B2 * | 4/2010 | Quian | ..................... | H02P 23/14 318/801 |
| 8,084,984 B2 * | 12/2011 | Lu | ...................... | H02P 29/0055 318/432 |
| 8,203,304 B2 * | 6/2012 | Lu | ...................... | H02P 23/0004 318/778 |
| 8,217,618 B2 * | 7/2012 | Cheng | ................... | H02P 23/02 318/727 |
| 8,674,650 B1 * | 3/2014 | Rabinovich | ............... | H02P 1/32 318/376 |
| 2003/0205989 A1 * | 11/2003 | Garrigan | ................ | B60L 11/02 322/28 |
| 2004/0130284 A1 * | 7/2004 | Lee | .......................... | H02P 6/10 318/400.23 |
| 2006/0232249 A1 * | 10/2006 | Kojori | ................ | H02M 5/4505 322/29 |
| 2008/0067970 A1 * | 3/2008 | Qian | ....................... | H02P 23/14 318/805 |
| 2008/0180055 A1 * | 7/2008 | Zargari | ............... | H02M 1/4216 318/729 |
| 2009/0058341 A1 * | 3/2009 | Lu | ....................... | H02P 23/0004 318/504 |
| 2010/0117588 A9 * | 5/2010 | Kelley | ................... | H02P 6/182 318/812 |
| 2010/0141192 A1 * | 6/2010 | Paintz | .................... | H02P 6/185 318/400.33 |
| 2010/0213886 A1 * | 8/2010 | Cheng | .................... | H02P 27/16 318/812 |
| 2011/0006709 A1 * | 1/2011 | Naiman | .................. | H02P 27/04 318/400.3 |
| 2011/0006720 A1 * | 1/2011 | Naiman | .................... | H02P 1/26 318/771 |
| 2012/0223668 A1 * | 9/2012 | Lu | ....................... | H02P 23/0004 318/805 |
| 2015/0097502 A1 * | 4/2015 | Wiik | ................... | H02P 23/0077 318/400.21 |

OTHER PUBLICATIONS

International Search Report, Application No. PCT/EP2012/056920, completed Feb. 8, 2013, dated Feb. 5, 2013, pp. 5.

* cited by examiner $V_{DC} = V_{ab,terminal}$
$V_{cb,terminal} > 0$ $V_{cb,source} > 0$
$V_{bc,terminal} = 0$ $V_{DC} = V_{ac,terminal}$
$V_{ab,terminal} > 0$ $V_{ab,source} > 0$
$V_{ab,terminal} = 0$ $V_{DC} = V_{bc,terminal}$
$V_{ac,terminal} > 0$ $V_{ac,source} > 0$
$V_{ac,terminal} = 0$

METHOD FOR ESTIMATING MOTOR PARAMETER IN A LOAD COMMUTATED INVERTER ARRANGEMENT, AND A LOAD COMMUTATED INVERTER ARRANGEMENT THEREFOR

FIELD OF THE INVENTION

The present invention relates generally to load commutated inverters and more particularly to a method for estimating motor parameter in a load commutated inverter arrangement.

BACKGROUND OF THE INVENTION

Load commutated inverters (LCI) are widely used in the process industry for the high power variable speed motor range. It offers a simple and reliable design where a minimum number of sensors are required. A simplistic view of a typical setup is illustrated in FIG. 1. Grid side voltage transformers 4 are used for synchronizing firing angle control to grid voltage. Grid side current transformers 1 are used to estimate a dc-current, which again is used for current control of grid side converter. Motor voltage transformers 2 are used for measuring motor voltage, which is necessary for detecting motor rotor position as well as for motor voltage control.

SUMMARY OF THE INVENTION

Performance and condition monitoring is gaining attention due to the severe consequences of degradations and unexpected failures of large rotating machinery such as compressors. Utilizing existing electrical information can be a valuable option since this is available information that is not in general used for this purpose today.

An accurate estimate of motor parameter is not necessary for high performance control of motor speed. However, for other purposes, such as detecting equipment degradations, a highly accurate estimation of motor parameters, such as motor input power, motor shaft power, motor commutation inductance and firing angle can be valuable. For instance, a validation of process power estimation, purely based on process measurement of for instance a compressor, could be important to qualify process measurements and gas composition assumptions. The problem is then to give a highly accurate estimate of shaft power with the limited information available. Basically, one could say that in a typical LCI setup, there is a continuous dc-current estimate available as well as a motor side ac-voltage measurement. However, this is not enough to evaluate the motor power in a direct way, which requires either both dc-voltage and dc-current, or measurement of two ac-voltages and two ac-currents. The problem is then to find a method that can supply an accurate power estimation based on the limited measurements typically available.

Another example is that of detecting motor commutation inductance changes. Motor commutation inductance will in normal cases be close to constant with main dependency towards the current. Changes to this inductance can be an indication of fault in the motor such as crack in damper bars, change in air-gap or fault in windings. The problem is then to give a highly accurate estimate of commutation inductance with again the limited measurements available.

Another example is that of detecting difference in actual firing angle and expected firing angle. The main control means for an LCI is the control of the firing angle set-point. The control assumes with its given models that the actual firing angle equals the set-point. Deviations might be due to control tuning errors or control hardware defects. The problem is then to give a highly accurate estimate of firing angle with again the limited measurements available.

An object of the present invention is thus to provide a method for estimating motor parameter in a load commutated inverter arrangement having a limited number of sensors.

This object, among others, is according to the present invention attained by a method and arrangement, respectively, as defined by the appended claims.

By providing a method for estimating a motor parameter in a load commutated inverter arrangement, comprising the steps of: measuring a motor side ac-voltage; detecting commutation interval information of the measured motor side ac-voltage; estimating a motor parameter based on the detected commutation interval information; and indicating when the estimated motor parameter deviates from a monitoring parameter thereof, estimation of a motor parameter is achieved with utilization of motor side ac-voltage sensors only.

A motor commutation inductance is preferably estimated based on an internal motor voltage, wherein the step of estimating a motor parameter comprises: converting the measured motor side ac-voltage to an internal motor voltage based on the detected commutation interval information.

A motor power is preferably estimated by measuring or estimating a dc-link current; and wherein the step of estimating a motor parameter comprises: converting the measured motor side ac-voltage to a dc-link voltage, or converting the measured or estimated dc-link current to an ac-current, based on said detected commutation interval information; and estimating a motor power based on the measured or estimated dc-link current and the converted dc-link voltage, or estimating a motor power based on the measured motor side ac-voltage and the converted ac-current.

In order to minimize utilization of sensors, the step of measuring or estimating a dc-link current is preferably performed by estimating the dc-link current through a grid side ac-current transformer, providing sufficient information for an adequate estimation of motor parameter.

The step of detecting commutation interval information, such as commutation interval length, commutation interval starting angle, and commutating phases are preferably performed by utilization of known jumps in a motor voltage space vector angle. Alternatively the step of detecting commutation interval information is e.g. performed by utilization of known voltage jumps during commutation in motor voltages.

The method preferably comprises a further step of estimating a shaft power for a motor power, enabling e.g. validation of process estimations for a compressor.

For monitoring a compressor process, the method preferably comprises the further steps of: estimating a process power for a compressor driven by a motor power; comparing the estimated motor power and the estimated process power; and generating an event when the comparison is outside a set boundary for the comparison.

For monitoring of e.g. commutation inductance, estimated motor commutation inductance is preferably compared to previously measured data where relationships to e.g. current can be included, i.e. comparing the estimated motor commutation inductance with the expected motor inductance. When the comparison is outside a set boundary for the comparison an indication is generated.

For monitoring of e.g. a motor firing angle condition, estimation thereof is preferably based on a converted internal motor voltage and the detected commutation interval information. The expected firing angle condition, based on controller set-point or known relationships, is compared with the estimated firing angle, and an event is generated when the comparison is outside a set boundary for the comparison.

By providing a load commutated inverter arrangement for estimation of a motor parameter, comprising: a grid side ac-current sensor; a motor side ac-voltage sensor; and a controller arrangement connected to the grid side ac-current sensor, the motor side ac-voltage sensor, and to a motor, wherein the controller arrangement is configured to detect commutation interval information based on data from the motor side ac-voltage sensor; the controller arrangement is configured to estimate a motor parameter based on the commutation interval information; and the controller arrangement is configured to generate an indication when the estimated motor parameter deviates from a monitoring parameter thereof, monitoring of one or more motor parameters are achieved with utilization of motor side ac-voltage sensors only.

BRIEF DESCRIPTION OF THE DRAWINGS

The present invention will become more fully understood from the detailed description of embodiments given below and the accompanying figures, which are given by way of illustration only, and thus, are not limitative of the present invention, wherein.

DETAILED DESCRIPTION OF THE INVENTION

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

A load commutated inverter arrangement and a method for estimating a motor parameter thereof according to an embodiment of the present invention will now be described with reference to FIGS. 1-7.

The present invention is for accurately estimating a motor parameter based on the limited number of sensors that are typically available in an LCI installation. The basic estimation is made by measuring a motor side ac-voltage from a sensor 2 and detecting commutation interval information therefrom.

The estimate is however preferably based on a grid side ac-current sensor 1 and a motor side ac-voltage sensor 2, which gives high accuracy for the estimation of e.g. motor power. Alternatively, a dc-current sensor can be used instead of the grid side ac-current sensors, and the dc-link current will then be measured directly.

The method can in an automated way analyze an ac-voltage shape/waveform in detail and extract commutation interval information from this waveform that can be used to identify commutation interval length, commutation interval starting angle, and commutating phases. Based on the commutating interval information ac-voltage, can then be converted to dc-voltage, for use together with dc-current in power estimation, or dc-current can then be converted to motor ac-current, for use together with motor voltage in power estimation, or motor ac-voltage can be converted to internal motor voltage for use together with dc-current in firing angle and commutation inductance estimation. The estimated motor power can then be used to e.g. characterize the operation of the load and to be able to validate performance calculations on the process side, the estimated motor commutation inductance can then be used to e.g. detect changes in motor characteristics that can indicate a faulty condition, and the estimated firing angle can then be used to e.g. validate that the firing angle controller operates as expected.

Figure 1:
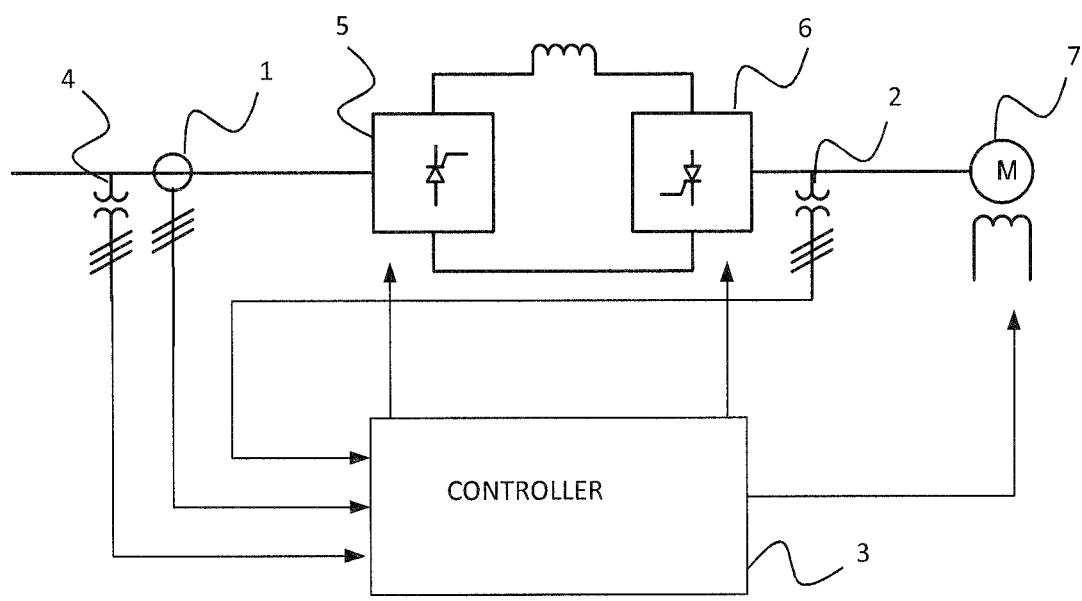
FIG. 1 is a schematic drawing of motor control using a Load Commutated Inverter.

The operation of a typical load commutated inverter arrangement, illustrated in FIG. 1 is well known, and the sequence of current conduction through the different phases is unique. The load commutated inverter arrangement comprises a controller arrangement 3 connected to a grid side voltage transformer 4 for synchronizing firing angle control to grid voltage. The controller 3 is also connected to a grid side current transformer 1 for estimating of the dc-current for current control of the grid side converter 5. The controller 3 is further connected to a motor side voltage transformer 2 for measuring motor voltage for detecting motor 7 rotor positions. The grid side ac-current transformer 1 is in this embodiment used as sensor 1 for estimation of the dc-link current. The motor side voltage transformer 2 is in this embodiment used as motor side ac-voltage sensor 2. The controller 3 is also connected to the inverters 5, 6 and the load 7, to control them in dependence on the sensors. There are a number of versions of an LCI arrangement, where a 12-pulse arrangement is the most common. The present invention is not limited to the one used in this description, but can be applied to any common LCI arrangement.

The execution of a motor parameter estimate function can occur in a CPU unit different than that of the actual control.

Figure 2:
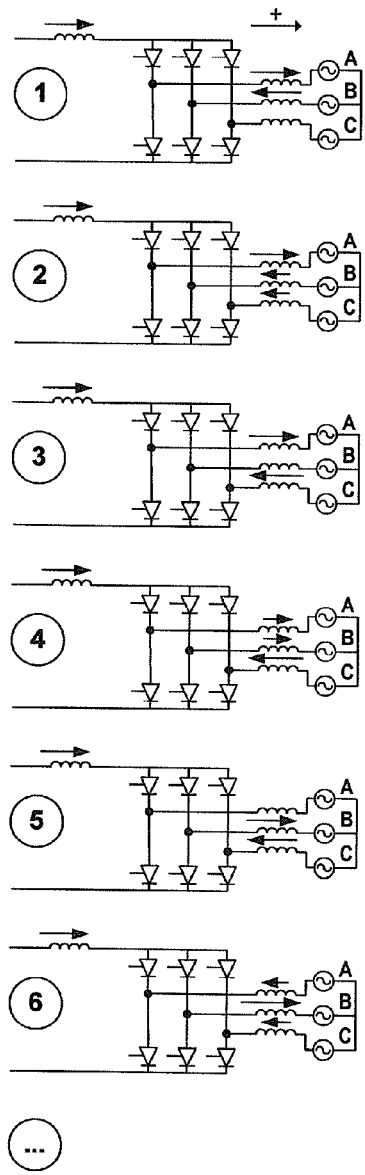
FIG. 2 schematically illustrates a current path sequence for a LCI inverter thyristor bridge.
Figure 2:
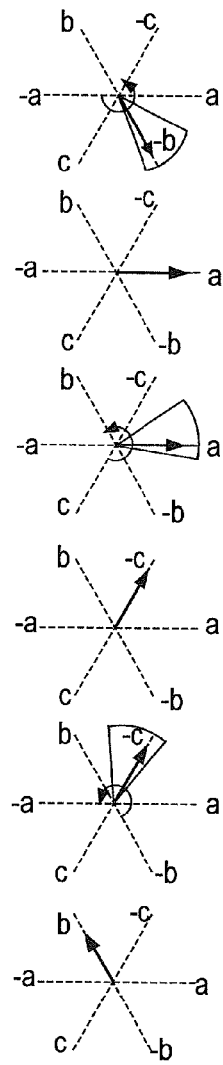

Current conduction states for one half-cycle for a load commutated inverter thyristor bridge are illustrated in FIG. 2. Indication of commutation is when current flows in all three phases. The voltage subscript terminal ($V_{terminal}$) indicates voltage at the motor terminal actually measured, while the voltage subscript source ($V_{source}$) indicates the internal motor voltage. The right part of FIG. 2 illustrates the motor terminal voltage as a space vector. During commutation, the voltage vector will be pointing in a fixed direction.

A first step in estimation of motor power is to identify which periods of time that commutation occurs, by identifying commutation interval length, commutation interval starting angle, and/or commutating phases.

Several approaches can be used to identify these periods of time, of which two are: using known jumps in motor voltage space vector angle, and using known voltage jumps during commutation in motor voltages. Known voltage jumps method can e.g. be based on the knowledge that one line voltage is shorted during commutation. By identifying the shorted line voltage and the size (positive or negative) of the two other line voltages, the commutating phases can be identified. Alternatively, methods for identifying steps in voltage can be applied by e.g. subtracting the fundamental component of the voltage waveform.

In the following, a detailed description of using motor voltage space vector angle to identify these periods of time is described.

Three phase voltages can be expressed as a space vector, two phase quantities, by assuming the sum of all voltages to be zero. Space vectors for the different conduction intervals are illustrated in the right part of FIG. 2. When currents are not commutating, the terminal space vector will be similar to the internal motor voltage, namely a space vector moving at close to constant rotational speed. However, during the commutation interval, the direction of the space vector is pointing in a fixed direction, where the angle is dependent on the specific commutation interval.

It can be found that the examination of the space vector angle is a good indicator for when commutation starts and stops. When a commutation starts, the space vector angle quickly jumps to a new fixed angle position, and when the commutation ends, it jumps back close to the rotating internal motor voltage again. Commutation identification can then be based on identifying these phase jumps.

Figure 3:
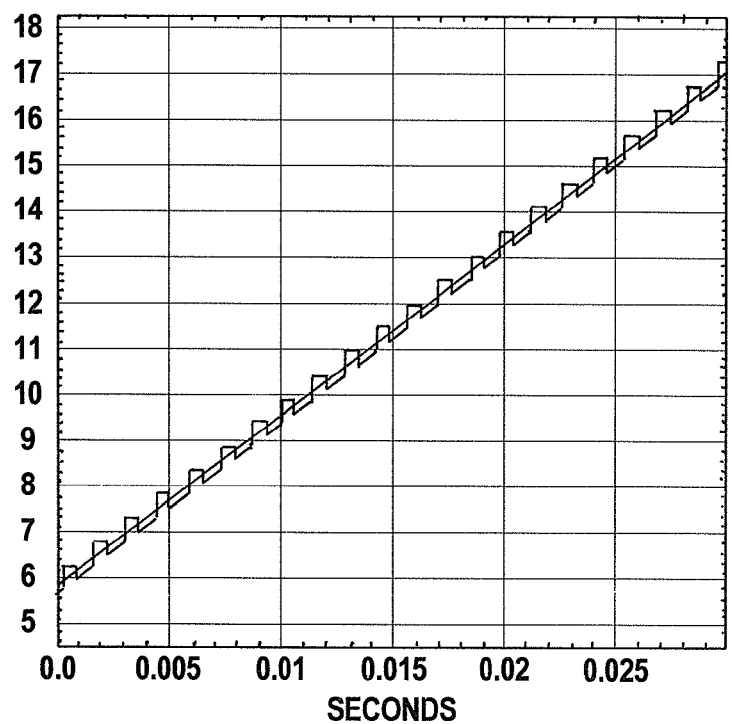
FIG. 3 is a diagram illustrating a calculated space vector angle and its linear approximation.

FIG. 3 gives an example of the space vector angle, line to line voltage, and its linear approximation, illustrating a calculated space vector angle and the linear approximation thereof. Values are given in radians, set to be continuously increasing.

Figure 4:
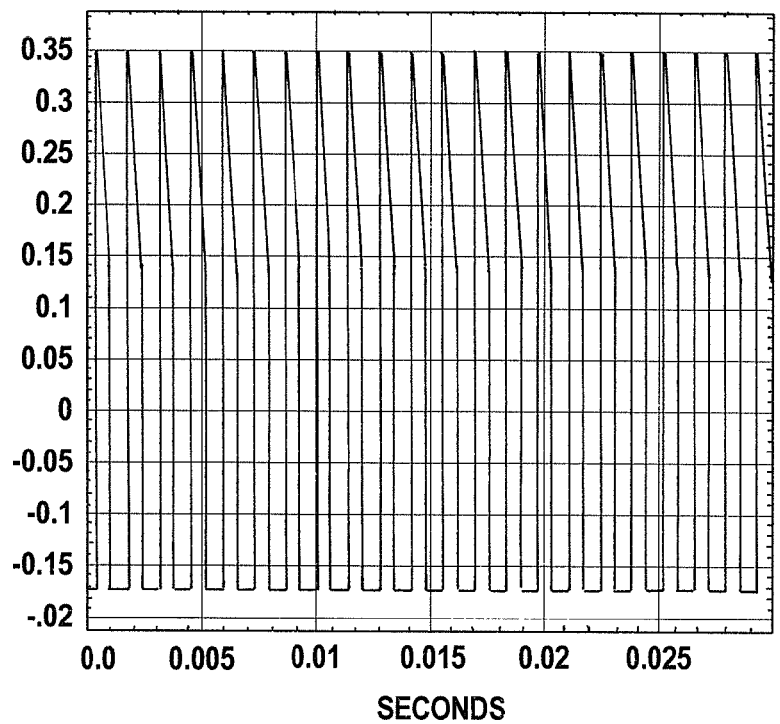
FIG. 4 is a diagram illustrating a space vector angle error.

The phase jumps due to commutation are clear and systematic in the diagram. The simulated curves are in this embodiment based on a 12-pulse operation. By subtracting the space vector angle by its linear estimate, an angle error signal can be produced as illustrated in FIG. 4. The angel error signal is the difference between actual angle and a linear estimate thereof. By applying simple algorithms regarding level change of angle, the commutation starts and stops can easily be identified. Example of other alternatives to using a linear estimate is to use a filtered version of the actual space vector angle or output of a phase locked loop (PLL) tuned with relatively slow response.

The next step is to identify the current conduction state for the different commutations identified. Also, the identification will for a 12-pulse system identify commutations in both sets of windings, and the in-phase commutations must in particular be identified. It has been found that this can be implemented easily by sorting on the average angle during the commutation, as the space vector angle for a given commutation is well defined, as illustrated in FIG. 2. If using the line voltages as base for evaluating, the angles are shifted 30 degrees. At this stage, all details regarding commutation length, start angle and/or commutating phase can be extracted.

Figure 5:
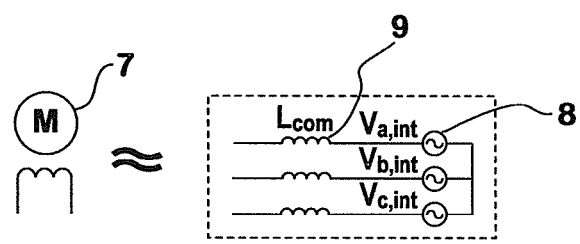
FIG. 5 schematically illustrates an equivalent circuit of a synchronous motor during commutation.

Next, during a commutation, the synchronous motor 7, which is driven by the LCI, can be represented as a voltage source 8, V, and a commutating inductance 9, $L_{com}$ as illustrated in FIG. 5.

Commutation angle can from theory be estimated based on the equation:

$$v_{ll,int}(t) = 2L_{com}\frac{di_L}{dt}, \quad (1)$$

where $v_{ll,int}(t)$ is the line to line internal motor voltage between the two commutating phases, $L_{com}$ is the commutation inductance and $i_L$ is the current being built up in the phase the current is commutating to. An estimate is required of the internal voltage. This can be achieved by assuming the internal voltage to be equal to the terminal voltage in periods where there is no commutation occurring. Based on these periods, the amplitude and phase of the internal voltage can be estimated. If desired, some correction of the resistive voltage drop can also be applied.

For estimation of commutation inductance, an estimation of firing angle is also required. The firing angle can be estimated by comparing the identified commutation instances with the estimated phase of the internal voltage.

By integrating from zero to the dc-current level the commutation inductance is derived by the following equation:

$$L_{com} = \frac{\sqrt{2}\,V_{ll,int}}{2\omega I_{dc}}(\cos(\alpha) - \cos(\alpha + u)), \quad (2)$$

where $V_{ll,int}$ is the rms (root mean square) of the internal line to line voltage, ω is the electrical speed, u is the commutation angle, α is the firing angle in relation to the internal voltage and $I_{dc}$ is the dc-current.

Figure 6:
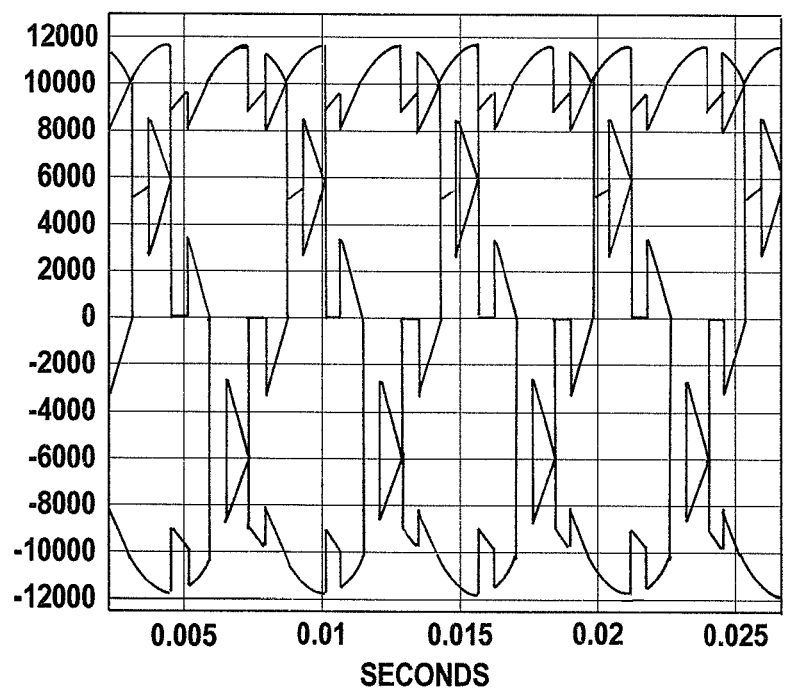
FIG. 6 is a diagram illustrating an estimated dc-voltage from ac-voltages.
Figure 7:
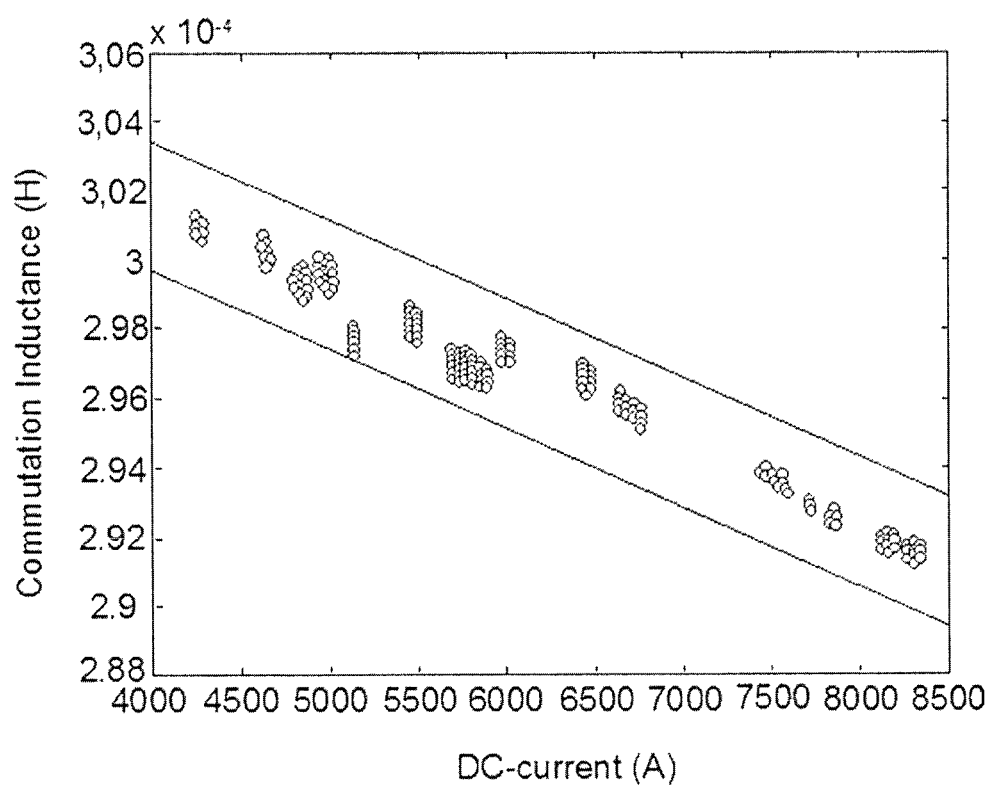
FIG. 7 is a diagram illustrating commutation inductance and its dependency to dc-current for an exemplary LCI.

FIG. 2 shows that there is a specific sequence of commutation intervals and conduction periods. When a thyristor is conducting, the voltage at the ac-terminal is connected to the specific dc-pole. By considering conduction sequence, it can be seen that at start of every commutation, a new line voltage directly represents the dc-voltage. A dc-voltage can then be estimated throughout all samples, as illustrated in FIG. 6. By such an estimated dc-voltage, it is not necessary to add a sensor for measurement thereof. This dc-voltage does not contain the voltage drop across the thyristor. This means that the motor power calculated based on the estimated dc-voltage and the measured dc-current will be close to representing the input to the motor. In FIG. 6 the dc-voltage is estimated from ac-voltages based on knowledge of current conduction period and their influence on mapping of ac to dc voltage. An ac-voltage AB curve starts at about 11500 in the diagram, an ac-voltage BC starts at about −3000 in the diagram, an ac-voltage CA starts at about −8000 in the diagram, and the mapped estimated dc-voltage starts at about 8000 in the diagram.

Alternatively, it is possible to estimate an ac-current based on the dc measurements. This can be performed based on knowledge of commutation instance and commutation length. An expression of the fundamental current component can easily be made. Based on identification of commutation start angle, it is then possible also to estimate the ac-current angle in relation to the ac-voltage, and then the ac-power.

The calculated motor power can further be corrected with estimation of losses such as core losses, copper losses, stray losses, mechanical losses, etc. Such loss models are widely available in literature and can for instance be copper losses represented as:

$$P_{cu} = n_w I_{ac}^2 R_{cu}, \quad (3)$$

where $n_w$ is the number of phases (6 in a 12-pulse machine), $I_{ac}$ is the ac rms current and $R_{cu}$ is the copper winding resistance for the given frequency range. Various expressions exist for core losses with a simple approximation given by:

$$P_{co} = k\hat{B}_{ac}^{n_b} f^{n_f}, \quad (4)$$

where k is a core loss factor, $B_{ac}$ is the peak flux density, $n_b$ is the core loss ac exponent, f is the fundamental frequency and $n_f$ is the core loss frequency exponent.

The estimated commutation data can be monitored to indicate either change to motor or change to electrical sensors. If the commutation characteristic changes for a given set of conditions, this can be an indication that motor parameter or electrical sensor condition has changed.

One example of commutation data that can be monitored is the commutation inductance. The estimate of commutation inductance described was based on idealized conditions and will ideally remain constant. However, in reality there will be some dependency to a range of variables such as the commutating current (dc-current), the flux density and the temperature. To enable an improved monitoring capability, the most significant dependencies should be taken into account into the monitoring process. One example is taking into account only the dependency to dc-current. An example of data from an LCI is given in FIG. 7 and shows that by taking into account the dependency towards dc-current, a more narrow band can be set for differentiating between normal operation and changes compared to normal situation, compared to the variation of commutation inductance independent of dc-current.

Furthermore, all commutation periods, 12 in a 12-pulse machine, can be monitored separately in order to control if there is a change in a specific part of the machine.

The benefit of commutation data monitoring is to detect changes in electrical sensors or motor characteristic changes to be able to take corrective actions.

The energy going into the fluid of a compressor can be estimated based on process measurements such as flow, pressure, temperature. Due to some measurement uncertainty and also uncertainties regarding gas composition and gas model, there is a need to validate the process power measurements if to be used for detailed performance monitoring. The power going into the motor of the compressor will be transferred to mechanical power that minus some losses will result in process power.

The estimated motor power and/or the estimated shaft power can according to the present invention further be utilized for e.g. process power validation. By comparing either the estimated motor power, or the estimated shaft power based on motor power, and the power estimate from the process side, a validation of the correctness of the process power calculation can be achieved. If the deviations are outside certain boundaries, an event/alarm can be generated that can be used to initiate further investigations. Also, change in this deviation can be monitored over time, where also point of operation is taken into account.

The method for estimating a motor parameter in a load commutated inverter arrangement, comprising the steps of:
measuring a motor side ac-voltage;
detecting commutation interval information of the measured motor side ac-voltage;
estimating a motor parameter based on the detected commutation interval information; and
indicating when the estimated motor parameter deviates from a monitoring parameter thereof.

For estimation of a motor commutation inductance, the step of estimating a motor parameter comprises:
converting the measured motor side ac-voltage to an internal motor voltage based on the detected commutation interval information; and
estimating a motor commutation inductance based on the converted internal motor voltage.

For estimation of a motor power, the method comprises the further steps of:
measuring or estimating a dc-link current; and
wherein the step of estimating a motor parameter comprises:
converting the measured motor side ac-voltage to a dc-link voltage, or converting the measured or estimated dc-link current to an ac-current, based on the detected commutation interval information; and
estimating a motor power based on the measured or estimated dc-link current and the converted dc-link voltage, or estimating a motor power based on the measured motor side ac-voltage and the converted ac-current.

It will be obvious that the present invention may be varied in a plurality of ways. Such variations are not to be regarded as departure from the scope of the present invention as defined by the appended claims. All such variations as would be obvious for a person skilled in the art are intended to be included within the scope of the present invention as defined by the appended claims.

What is claimed is:

1. A method for estimating a motor parameter in a load commutated inverter arrangement, comprising the steps of:
measuring, with a sensor, a motor side ac-voltage;
detecting, with a controller, commutation interval information of the measured motor side ac-voltage;
estimating, with the controller, a motor parameter, comprising:
converting the measured motor side ac-voltage to an internal motor voltage based on the detected commutation interval information,
estimating a firing angle based on the converted internal motor voltage, and
estimating a motor commutation inductance based on the estimated firing angle and the converted internal motor voltage; and
indicating, with the controller, when the estimated motor parameter deviates from a monitoring parameter thereof,
wherein the step of indicating comprises indicating a faulty condition of a motor.

2. The method according to claim 1, comprising the further steps of:
measuring or estimating a dc-link current; and
wherein said step of estimating a motor parameter comprises:
converting the measured motor side ac-voltage to a dc-link voltage, or converting the measured or estimated dc-link current to an ac-current, based on said detected commutation interval information; and
estimating a motor power based on the measured or estimated dc-link current and the converted dc-link voltage, or estimating a motor power based on the measured motor side ac-voltage and the converted ac-current.

3. The method according to claim 2, wherein said step of measuring or estimating a dc-link current is performed by estimating the dc-link current through a grid side ac-current transformer.

4. The method according to claim 2, comprising a further step of estimating a shaft power for said motor power.

5. The method according to claim 2, comprising the further steps of:
   estimating a process power for a compressor driven by said motor power; and
   indicating when the estimated motor power deviates from the estimated process power outside a set boundary thereof.

6. The method according to claim 1, wherein said step of detecting commutation interval information is performed by utilization of known jumps in a motor voltage space vector angle.

7. The method according to claim 1, wherein said step of detecting commutation interval information is performed by utilization of known voltage jumps during commutation in motor voltages.

8. The method according to claim 1, wherein said commutation interval information comprises commutation interval length, commutation interval starting angle, and/or commutating phases.

9. The method according to claim 1, wherein said estimated motor commutation inductance is used to detect a motor faulty condition.

10. The method according to claim 1, wherein the sensor comprises a transformer.

11. The method according to claim 1, wherein estimation of the motor parameter is achieved with utilization of motor side ac-voltage sensors only.

12. A load commutated inverter arrangement for estimation of a motor parameter, comprising:
   a grid side ac-current sensor;
   a motor side ac-voltage sensor; and
   a controller arrangement connected to said grid side ac-current sensor, said motor side ac-voltage sensor, and to a motor, wherein
   said controller arrangement is configured to detect commutation interval information based on data from said motor side ac-voltage sensor;
   said controller arrangement is configured to estimate a motor parameter, configured to convert the measured motor side ac-voltage to an internal motor voltage based on the detected commutation interval information, configured to estimate a firing angle based on the converted internal motor voltage, and configured to estimate a motor commutation inductance based on the estimated firing angle and the converted internal motor voltage; and
   said controller arrangement is configured to generate an indication when the estimated motor parameter deviates from a monitoring parameter thereof,
   wherein the indication comprises a faulty condition of the motor.

13. A rotary machine arranged in a load commutated inverter arrangement according to claim 12.

* * * * *